Dec. 14, 1965  J. C. CLARK  3,223,347

SPIN-CASTING FISHING REEL

Filed Oct. 25, 1962  2 Sheets-Sheet 1

INVENTOR.
Joseph C. Clark
BY
ATTORNEYS.

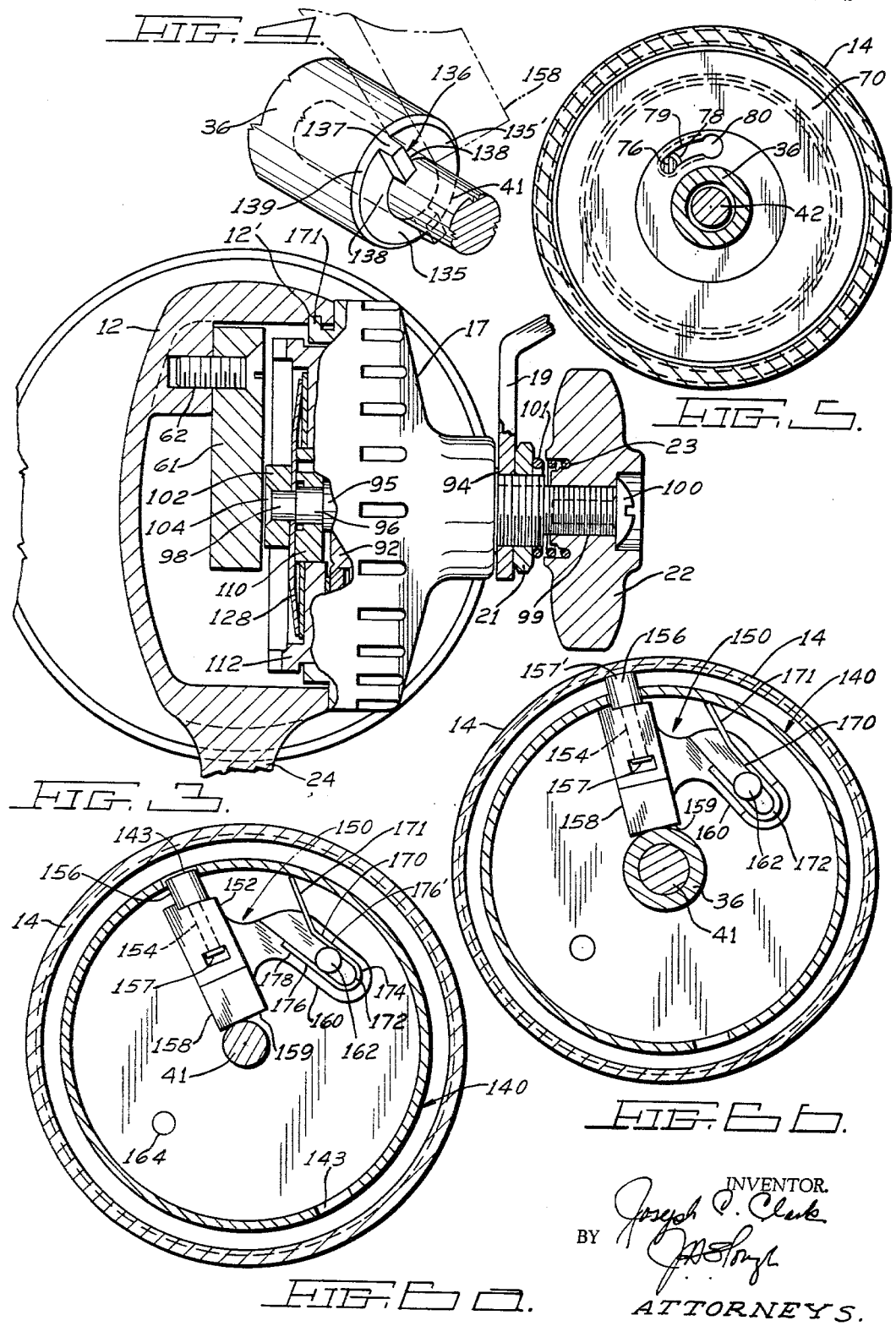

United States Patent Office 3,223,347
Patented Dec. 14, 1965

3,223,347
SPIN-CASTING FISHING REEL
Joseph C. Clark, Orlando, Fla., assignor to True Temper Corporation, Cleveland, Ohio, a corporation of Ohio
Filed Oct. 25, 1962, Ser. No. 233,000
4 Claims. (Cl. 242—84.2)

This invention relates in general to fishing reels of the so-called spinning type and relates more particularly to new and improved means for winding or retrieving the fishing line.

In certain prior spinning type reels, various type pickup devices have been employed which can be brought into operation for line control during casting and retrieving and one such arrangement is disclosed in U.S. Letters Patent No. 2,644,647, wherein a cam arrangement is provided to move the pickup means into an extended, line-engaging position and a push button is provided associated with the pickup means for withdrawing the pickup means into non-line-engaging position. Somewhat similar cam arrangements are shown and described in U.S. Letters Patent 2,667,312 and 2,988,298.

With the above cam arrangements a substantially complete revolution of the winding means is required for moving the pickup means into a line-engaging position which results in a time lag during which the pickup is relatively ineffective and incapable of line control.

It is therefore a primary object of my invention to appreciatively shorten the time lag between the initial rotation of the rotating crank or handle and the effective operation of the pickup means.

A further object of my invention is to provide a pickup means whereby the said pickup means is adapted to move into its extended line guiding position in a quick, positive manner.

Yet another object of my invention is to reduce friction in the line-retrieving operation by providing a substantially frictionless pickup member.

Yet another object of my invention is to provide a pickup means which is relatively inexpensive to manufacture, is composed of but few parts, is simple in construction, and is easily assembled and disassembled from the spinning reel.

These and other objects will become more apparent from the ensuing specification and accompanying drawings, in which:

FIG. 3 is a vertical sectional view, clearly showing in an enlarged manner the novel drag system of my invention;

FIG. 4 is a perspective view showing in dotted lines the lower portion of the line pickup means and in solid lines the member associated therewith adapted to extend the line pickup means into a line-engaging position;

FIG. 5 is a vertical sectional view taken on line 5—5 of FIG. 2 and showing the manner in which the stationary spool member is affixed to the housing;

FIG. 6a is a sectional view showing the line pickup means in its withdrawn, non-line-engaging position;

FIG. 6b is a vertical sectional view showing the line pickup member in an extended line-engaging position.

Figure 1:
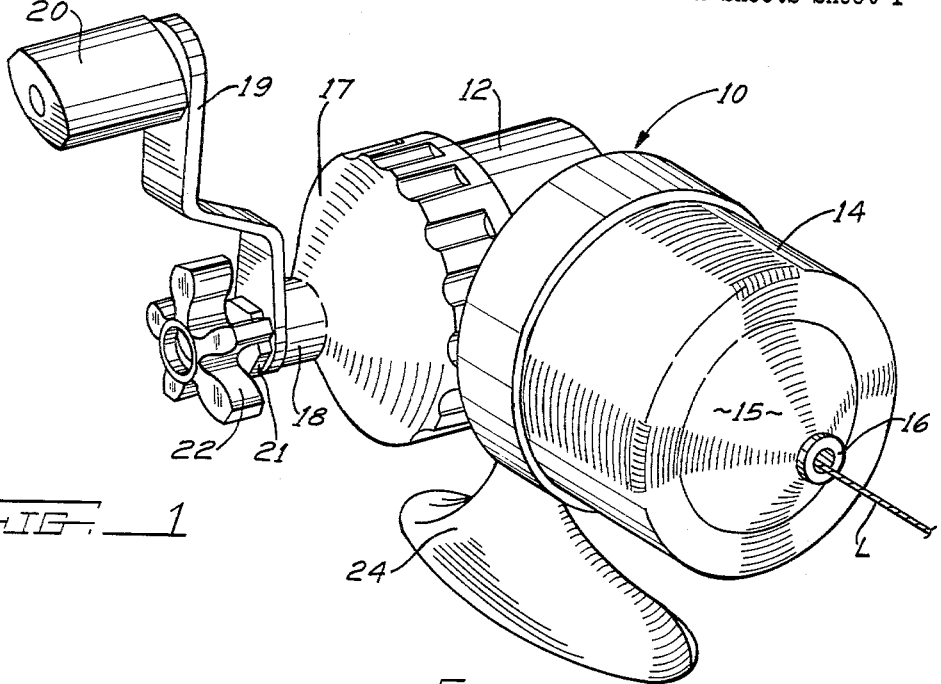
FIG. 1 is a perspective view of a spinning reel assembly having associated therewith the novel line pickup means and drag system of my invention.
Figure 2:
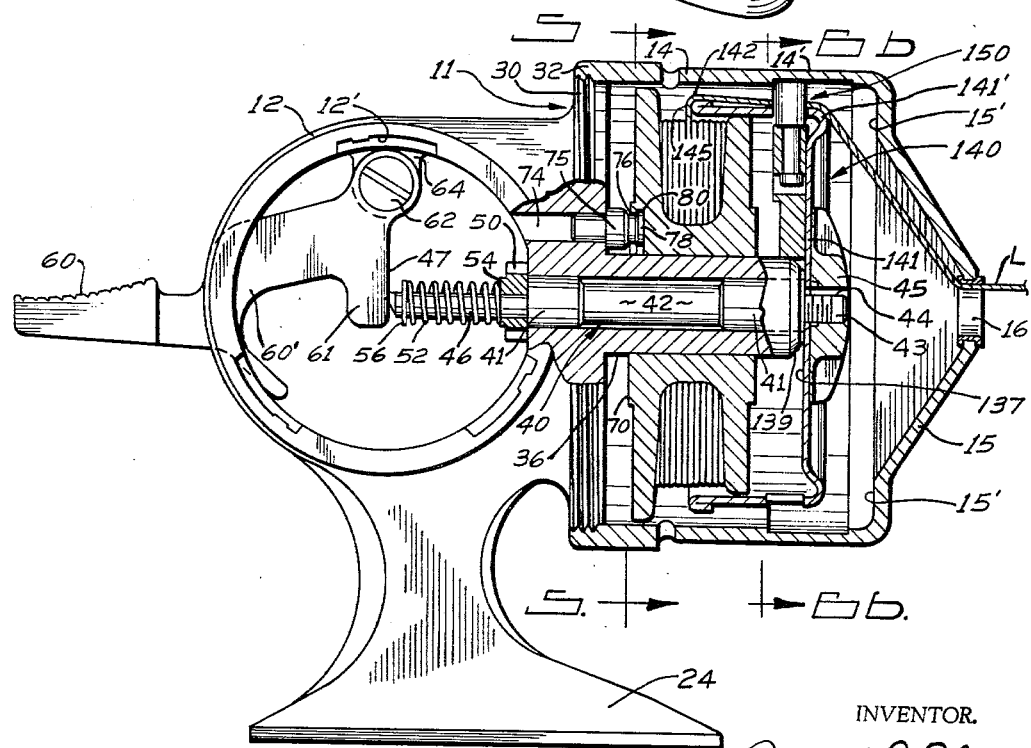
FIG. 2 is a vertical sectional view of the spinning reel of FIG. 1, clearly showing the line pickup means of my invention.

Referring now to the drawings, in which all like parts are designated by like reference characters, the spinning reel of my invention, generally indicated at 10 comprises a hollow housing 11 consisting of a main gear housing member 12 having a peripheral externally threaded flange 30 on which is threaded the circular flange 32 of a shroud 14. In the form shown herein, the shroud 14 is provided with a conical forward portion 15 having a line guide eyelet 16 at its apex whereby the line may flow out through this eyelet and emerge from the front of the reel. It will be noted that the forward face of the shroud 14 is provided with an annular flange 15′ depending vertically from the flange 32 of the shroud and encircling the conical portion of said shroud. The said flange portion 15′ cooperates with the winding drum 140 to snub the line and control the start and end of the cast, as will be explained below. The flange 32 of the housing 14 is preferably provided, as illustrated in FIG. 2, with an undercut groove 14′ to accommodate the pickup means, as will be explained hereinbelow. A removable side plate 17 is preferably secured in threaded engagement to the housing portion 12 for easy attachment or removal and combines with the said housing 12 to form an opening in which driving and drag mechanism is positioned. A drive shaft 95 for a crank 19 is disposed through the hub 18 of the side plate 17, and in the form shown, a star wheel 22 is disclosed mounted exteriorly of the crank. A reel seat base member 24 is shown preferably integrally formed with the housing member 12.

The forward wall of the gear housing 12 is provided with a forwardly projecting cylindrical, tubular bearing support member 36, preferably integrally formed with the housing portion 12 and adapted to support the spool 70 and to accommodate rotating and axially reciprocating movement of a shaft 40 disposed therethrough. The shaft 40, which is adapted to carry a winding drum 140 and pickup means 150 at its forwardly disposed end, preferably consists of a relatively elongated shaft portion of lesser diameter 42, and shaft portions 41 at opposite ends of said portion 42 of relatively greater diameter. The shaft portion 42 is preferably disposed in spaced relation to the cylindrical member 36 to reduce friction between the rotating and reciprocating shaft 40 and the bearing support member 36. At its forward end the shaft 40 is provided with a semi-arcuately threaded end portion 43 over which a winding drum 140 having a corresponding semi-arcuate opening is telescoped. The drum 140 is secured to the shaft 40 by threading an outwardly flanged nut 45 on the threaded end of the shaft and is rotated and reciprocated thereby.

The shaft 40 is normally biased in a retracted position, as shown in FIG. 2, by means of a coil spring 52 telescopically mounted over an elongated end portion 46 of the shaft 40. In the form shown, the portion 46 is of relatively lesser diameter than the remainder of the shaft and preferably flattened on its uppermost surface. Referring specifically to FIG. 2, a spur gear 50 rotatably driven by the crank shaft in a manner well known in the art, is mounted on the end portion 46 of the shaft, and said gear 50 is provided with a shoulder 54 which bears against the forward end of the spring 52. The spring is secured at its rearmost end by a retaining ring 56 disposed rearwardly of the spring and seated within a groove shaft portion 46.

Referring now to the means for controlling movement of the line pickup means, it will be noted that a thumb lever 60 extends rearwardly and externally of the housing 11 and is provided with a shank 60′ slidable through an aperture in the rear of the gear housing 12, said shank being pivotably mounted by pin means 62 on a bracket 64 preferably projecting downwardly of and integrally formed in the upper wall of the housing 12. The thumb lever 60, as illustrated, is provided with a downwardly depending leg portion 61 having a preferably substantially flat forward face, adapted to contact the rearward end 47 of the plunger shaft 40. It will thus be seen that when the thumb lever 60 is depressed downwardly, the leg 61 moves forward, pivoting about the pin means 62, to move the shaft 40 forwardly within the tubular opening in the bearing support member 36. As will be more specifically pointed out below, the forward movement of the shaft 40, which is yieldingly resisted by the spring means, acts to withdraw the pickup means 150 into non-line-engaging position (FIG. 6a), whereby the line L can flow freely outwardly around the winding drum 140 and through the eyelet 16.

Referring now generally to the manner in which rotation of the rotating crank or handle 19 causes rotation of the shaft 40, it will be noted by reference to FIG. 3 of the drawings that the crank handle 19 is mounted on a threaded end portion 94 of a crank sleeve 92 and is retained thereon by means of a threaded nut 21. In the form shown, the drive shaft 95 is telescoped within the crank sleeve and provided with an outwardly projecting threaded end portion 99 and an opposite end portion projecting within the housing 12 consisting of a pair of stepped shaft portions 96 and 98. A screw 100 disposed within the drag knob 22 retains the same in threaded engagement with the outer threaded end 99 of the shaft 95.

A main driving gear 112, which intermeshes with spur gear 50 aforedescribed, is preferably, as illustrated, loosely mounted on a gear bushing 110 which is non-rotatably mounted on the shaft 95. A drag spring washer 128, spacer element 102, and rivet 104 are preferably provided to provide the means for adjustably mounting the main driving gear on the gear bushing 110. The gear bushing 110 is non-rotatably mounted on the stepped portion 96 of the shaft 95 and rotation of the crank sleeve 92, by movement of the crank 19, effects rotation of the said shaft and said bushing. The specific manner in which the main driving gear 112 is frictionally driven and the manner in which the drag system operates forms no part of the instant invention. It is apparent from the drawings that rotation of the handle 19 will cause rotation of the driving gear 112 meshed with the driven gear 50 and of the shaft 40 non-rotatably connected thereto.

As best illustrated in FIG. 2, a spool member 70 is normally mounted on the bearing support 36 of the housing 12 and is normally held stationary by spool anchor means 75. Although the spool 70 can be stationary mounted to the fixed housing by any suitable means, I preferably employ the bayonet slot arrangement, such as shown in FIG. 2 and in more detail in FIG. 5. The gear housing 12 is provided with an opening 74 in the forward wall thereof preferably parallel to the opening therein for the bearing support 36, which opening 74 is adapted to receive a spool anchor pin 75. The spool anchor pin illustrated is provided with a neck portion 76 and a relatively enlarged head portion 78 at the extreme forward end thereof. Referring now to FIG. 5, the rearwardly extending peripheral flange of the spool 70 is provided in the rear wall thereof with an arcuate slot 79, having a circular opening 80 of relatively greater radial extent at one end thereof. The said opening 80 in the slot 79 is of sufficient size to accommodate the enlarged head portion 78 of the spool anchor pin 75 and the elongated portion of the slot is adapted to seat the neck portion of the pin. To secure the spool 70 in the housing 14, the spool is telescoped over the bearing support 36 and moved rearwardly and rotated to a position wherein the enlarged head portion 78 of the spool anchor pin 75 can be located within the opening 80 in the spool flange. Rotation of the spool 70 in a clockwise direction thereafter, as viewed in FIG. 5, will cause the pin 75 to move in the slot 79 to an end thereof to couple the spool 70 to the housing 12. Axial movement of the spool 70 relative to the housing 12 is by this means prevented unless the spool 70 is manually rotated back to the position where the portion 78 of the spool anchor pin may be aligned with the opening 80. It will be noted that the mounting and removal of the spool is hence easily accomplished.

Referring more particularly to the novel line pickup means of applicant's invention, and to FIG. 4, the tubular bearing support member 36 is provided with a pair of projections or shoulders generally indicated at 136 and preferably integral therewith. The forward end of the support member 36 comprises, in addition to the projections 136, an annular chamfered ramp portion 139, and a pair of arcuate flat surfaces 135 and 135'. The shoulders or abutments 136 each have a chamfered outer peripheral surface 137 adjacent a portion of the chamfered annulus 139 and an arcuate inner periphery circumscribing a portion of the circular shaft 40 projecting therethrough. The shoulders 136 are provided with flat forward surfaces 136' generally parallel to the surfaces 135 and substantially parallel side walls 138. As best illustrated in FIG. 2, the tubular opening in the support 36 extends through its projection 136 and the shaft 40 extends therethrough. As will be more specifically explained hereinbelow, upon rotation of the crank 19, the projection 136 functions to elevate the rotating pickup means from a withdrawn, non-line-engaging position, as shown in FIG. 6a, wherein the lower end 159 of the said pickup means contacts portion 41 of shaft 40 and a leg of the said pickup means abuts the flat forwardly disposed face of the projection 136 to a final line pickup position wherein the pickup pin is seated on the outer periphery of the support member 36 in operative line-engaging position as shown in FIG. 6b, to rewind the line on the spool 70. As noted in FIG. 4, the chamfered surfaces 137 and annular chamfer 139 are inclined to substantially the same degree. As will be further explained hereinbelow, the pickup means is in contact with either of the surfaces 135 immediately prior to the elevation of the pickup means into line-engaging position.

As set forth above, the winding drum 140 is secured to the outer threaded portion 43 of shaft 40 and the winding drum 140 is adapted to rotate and reciprocate with the shaft 40. The winding drum 140 is provided, as indicated above, with pickup means generally indicated in FIG. 2 at 150 which means is pivotally mounted by stud or pin means 162 to the rear face of the drum 140 to provide an eccentric mounting therefor with respect to the shaft 40. As shown in FIG. 2, the pickup means 150 is adapted to extend through an opening 143 in the rearwardly extending flange portion 142 of the winding drum 140. The winding drum 140 is preferably provided with at least two such openings 143 whereby the pickup means 150 can be mounted at different positions on the winding drum 140. The winding drum 140 is further provided with an upwardly turned beaded surface 145 which facilitates the movement of the fishing line L over the winding drum 140, and an annular ridge 141' connecting the front wall 141 and the annular flange 142.

Referring now to FIGS. 6a and 6b, the pickup means generally indicated at 150 comprises a pickup slide 152 having a circular bore 154 therein, said bore 154 being adapted to receive a pickup pin 156 which is, in the form shown, provided with a cylindrical stem portion of slightly less diameter than the diameter of the bore within which it is slidingly disposed and said stem terminates at its lower end in an enlarged head 157 and at its upper end in an enlarged circular head 157'. The head 157 protrudes into a counterbore in the slide 152 and the enlarged head 157' is mounted above the slide and being of slightly less diameter than the opening 143. The pin hence is adapted to rotate within the slide. The pickup slide 152 is further provided with a generally rectangular, depending, relatively flat leg portion 158 having a straight lower edge 159, which is adapted to be biased downwardly to alternately come into contact with shaft 41, projection 136, or to make line contact with the outer surfaces of the support 36, as will be made more apparent hereinbelow. A laterally extending second leg portion 160 is also preferably integrally formed in the pickup slide 152 having an opening therein for the reception of the stud 162, the slide 152 being pivoted about the pickup pivot stud 162, as described, which is mounted in an opening 164 in the winding drum 140. There are preferably two openings in the annular forward wall of the winding drum 140, one of such openings being shown at 164 and the other of said openings, as noted above, receiving the pickup pivot pin 162. The plurality of openings 164 are preferably provided to enable the pickup slide 152 to be mounted in a plurality of positions on the winding drum in order to avoid excessive wear in any one location.

A pickup spring 170 of substantially hairpin type has an end 171 of one of its legs obliquely angled to engage the outer peripheral flange 142 of the drum 140 and its loop end 172 is seated within an arcuate abutment provided by the raised end 174 at the free end of the leg 160 of the pickup slide 152. The legs 176, 176' of the pickup spring 170 are adapted to resiliently clamp the stud 162. As best illustrated in FIGS. 6a and 6b, it will be noted that the angled end 171 serves to bias the pickup slide 152 into the inoperative line pickup position shown in FIG. 6a. In operation, as shown in FIG. 6b, when the pickup slide 152 is forced outwardly to a position in which the pin 157' extends trhough the opening 143 into line-engaging position, the leg 171 of the spring 170 is distorted from its normal position, thereby tensioning the same. It will thus be seen that when the straight edge 159 of the pickup slide 152 descends from its seated contact with the exterior surface of the support member 136, the spring 170 biases the pickup slide 152 into the withdrawn or retracted position, as shown in FIG. 6a.

The pickup pin 156 is preferably constructed of metallic material and the pick up slide 152 is preferably constructed of plastic. Due to the inherent resiliency of the plastic, the pickup pin 156 may be mounted in the arm 158 by the application of slight pressure downwardly whereby the enlarged head portion 157 of the pickup pin 156, which is only slightly larger than the bore 154, can be forced downwardly through the bore 154 to the position shown in FIG. 6a. It should also be noted that the stem of the pickup pin 156, which is positioned within the bore 154, is preferably of slightly less diameter than said opening 154 whereby the pickup pin 156 freely rotates within opening 154. The rotatability of the pickup pin 156 insures a smooth delivery of the line L onto the spool 70 and functions to significantly decrease the friction between the pickup pin and the fishing line.

When it is desired to withdraw the pickup pin 156 so that the line L can flow outwardly during the cast, the thumb lever 60 is depressed moving the shaft 40 forwardly within the tubular support member 36, thereby moving the winding drum 140 and pickup means 150 likewise forwardly.

When the winding drum 140 and its shaft 40 moves forwardly upon depression of the thumb lever 60, as aforesaid, straight edge portion 159 of the arm 158 of the pickup slide 152 leaves the exterior surface of the support member 36, shown in FIG. 2, and the pickup spring 170 causes the pickup slide 152 and the pickup pin 156 mounted therein to be withdrawn, wherefore the edge portion 159 thereof is lowered into contact with the relatively large diameter portion 41 of shaft 40, as shown in FIG. 6a, descending on chamfered surface 139 or surfaces 139, 137. As set forth above, when the pickup pin 156 is in its inoperative position, the line L can be freely withdrawn from spool 70, said line extending over bead 145, ridge 141' and outwardly through the eyelet 16.

When the cast has been made, and it is desired to retrieve the line, pressure on the thumb lever 60 is released. Subsequent to the release of pressure on thumb lever 60, spring pressure exerted by the spring means 52 causes the shaft 40 to move rearwardly. Upon the initial rearward movement of shaft 40, such rearward movement being accompanied by the rearward movement of the winding drum 140, the innermost face of the leg 158 of the pickup means 150 will contact the flat forward face of one of the shoulders 136.

The pickup pin 156 is next quickly moved outwardly through the opening 143 into its extended position within the undercut groove 14' by rotating the drum a slight amount by rotating the crank 19, moving therefore the leg onto one of the flat surfaces 135. Since the arcuate extent of each of the shoulders 136 is relatively slight compared to the arcuate extent of the surfaces 135 of the support member 36, the leg 158 will rapidly move onto the particular surface 135 upon the initial rotation of the crank 19. When the leg 158 is in contact with its respective flat surface 135, the pickup pin 156 is still in withdrawn position.

Continued rotation of the handle 19 will cause a side surface or face of the leg 158 to come into contact with either of the parallel side walls 138 of the shoulders 136. Further rotation of the crank 19 causes the pickup member 150 to pivot about the pivot pin 162 causing the leg 158 to ride upwardly onto the chamfered surface 137 of one of the shoulders 136. Still further rotation causes the leg 158 to move upwardly over chamfered annulus 139 into line contact with the outer periphery of the support member 36.

It will thus be seen that the pickup pin 156 can be moved from a withdrawn position to a fully extended position with only a relatively minor portion of a single revolution of crank 19. This arrangement is not only time-saving in the sense that the pickup pin is in an extended position during the initial portion of the rotation, but the novel pickup arrangement of my invention is further advantageous in that the pickup pin 156 moves practically instantaneously from the withdrawn position to an extended position. This is contrasted with the cam arrangements of the prior art wherein the pickup pin was only gradually elevated. This substantially instantaneous movement of the pickup means into line pickup position assures instantaneous rewind of the line.

It will thus be seen that I have accomplished the objects of my invention. I have provided a pickup means that is effective to move the pickup means from a withdrawn to an extended position in relatively short time by employing a relatively small part of a complete revolution of the rotating handle. This saving in time is accompanied by a positive, superior contact between the line and the pickup pin. Further the rotatably mounted pickup pin of my invention produces a substantially frictionless contact between the line and said pin.

It should be apparent that numerous changes can be made from the descriptions and drawings contained herein, without, however, departing from the true invention. My invention, accordingly, is defined in the following claims.

I claim:

1. In a fishing reel of the character described comprising a housing, said housing consisting of a gear casing and a centrally apertured spool casing, said year casing having a tubular member integrally formed therewith projecting forwardly of the same into the spool casing, a line carrying spool carried by said tubular member, a driven shaft rotatably and axially movable in said tubular member and spring-urged toward a rearward portion therein having a portion extending forwardly of said tubular member when in said rearward position, a winding drum member secured to the said forwardly extending portion of said shaft and adapted to rotatably and axially move therewith, said winding drum member having a part telescopically receiving said spool, said part having an enlarged opening therethrough, said winding drum member having line pick-up means eccentrically mounted on the inner face of the forward portion thereof, said pick-up means comprising a pick-up slide having a circular bore therein, a pick-up pin rotatably disposed within said bore, said slide being provided with a lower edge portion adapted to contact said driven shaft during one position of operation of said reel and to contact the outer periphery of said tubular member forwardly of the spool carrying portion thereof during a different operative position, said tubular member having a pair of projections disposed forwardly of said tubular member on opposite sides of the forward face thereof and flat surfaces interposed between flat side walls provided on the said projections, said projections being provided with arcuate upper surfaces abutting the outer periphery of said tubular member, said projections being of relatively less arcuate extent than that of the flat interspaced surfaces of the tubular member, said pick-up means being adapted to seat in a non line-engaging position on a forward portion of said shaft when said shaft is axially moved to a forward position in said spool casing, release of said spring pressure causing said pick-up pin to engage the forward end of said tubular member, rotation of the winding means causing the lower edge of said pick-up means to move rearward on the arcuate portion of an adjacent projection to elevate the said pick-up means to the outer periphery of the tubular member and project the rotatable pick-up pin through the said opening in the winding means to contact the line.

2. The combination of claim 1 wherein said pick-up means includes a laterally extending leg portion integrally formed in the pick-up slide, said leg portion being pivotally secured and eccentrically positioned on the said inner face of the winding drum member.

3. The combination of claim 2 wherein the said leg portion is provided with an arcuate abutment to the free end of said leg, a pick-up spring of substantially hairpin form having a yoke seated within said arcuate abutment, said spring having an angled leg adapted to engage the inner face of the part telescopically surrounding said spool.

4. The combination of claim 1 wherein said line carrying spool is provided with a groove in the rear face of said spool member, spool anchoring means secured in a forwardly disposed abutment in said gear casing, said spool anchoring means being adapted to be disposed within said groove to lock said spool in non-rotatable position.

References Cited by the Examiner
UNITED STATES PATENTS

| | | | |
|---|---|---|---|
| 411,926 | 10/1889 | Mawson | 242—46.21 |
| 2,675,192 | 4/1954 | Hull | 242—84.2 |
| 2,903,201 | 9/1959 | Sarah | 242—84.2 |
| 2,926,863 | 3/1960 | Mauborgne | 242—84.2 |
| 2,942,799 | 6/1960 | Meulnart | 242—84.2 |
| 3,018,979 | 1/1962 | Clickner | 242—84.21 |
| 3,022,961 | 2/1962 | Sawamura et al. | 242—84.21 |
| 3,036,789 | 5/1962 | Mauborgne | 242—84.21 |
| 3,041,002 | 6/1962 | Hull | 242—84.2 |
| 3,074,665 | 1/1963 | Morrow | 242—84.21 |
| 3,085,766 | 4/1963 | Salmivuori | 242—84.21 |
| 3,123,318 | 3/1964 | Wood | 242—84.2 |
| 3,152,771 | 10/1964 | Maury et al. | 242—84.2 |

MERVIN STEIN, *Primary Examiner.*

RUSSELL C. MADER, *Examiner.*